United States Patent
Lin et al.

(10) Patent No.: US 8,682,086 B2
(45) Date of Patent: Mar. 25, 2014

(54) SYSTEMS AND METHODS FOR DETERMINING IMAGE REPRESENTATIONS AT A PIXEL LEVEL

(75) Inventors: Yuanqing Lin, Cupertino, CA (US); Kai Yu, Santa Clara, CA (US)

(73) Assignee: NEC Laboratories America, Inc., Princeton, NJ (US)

(*) Notice: Subject to any disclaimer, the term of this patent is extended or adjusted under 35 U.S.C. 154(b) by 476 days.

(21) Appl. No.: 13/109,997

(22) Filed: May 18, 2011

(65) Prior Publication Data

US 2011/0299789 A1     Dec. 8, 2011

Related U.S. Application Data

(60) Provisional application No. 61/350,653, filed on Jun. 2, 2010.

(51) Int. Cl.
*G06K 9/00*   (2006.01)
*G06K 9/36*   (2006.01)

(52) U.S. Cl.
USPC .......................................... 382/232; 382/253

(58) Field of Classification Search
USPC ................................................. 382/232–253
See application file for complete search history.

(56) References Cited

U.S. PATENT DOCUMENTS 5,615,282 A * 3/1997 Spiegel et al. ............... 382/167
8,538,183 B1 * 9/2013 d'Eon et al. ................. 382/252

OTHER PUBLICATIONS

Samy Bengio, et al., Group Sparse Coding, NIPS 2009 pp. 1-8.

* cited by examiner

*Primary Examiner* — Brian Le
(74) *Attorney, Agent, or Firm* — Joseph Kolodka; Bao Tran (57) ABSTRACT

Systems and methods process an image having a plurality of pixels includes an image sensor to capture an image; a first-layer to encode local patches on an image region; and a second layer to jointly encode patches from the same image region.

19 Claims, 5 Drawing Sheets

SYSTEMS AND METHODS FOR DETERMINING IMAGE REPRESENTATIONS AT A PIXEL LEVEL

This application claims priority to provisional application Ser. No. 61/350,653 filed on Jun. 2, 2010, the content of which is incorporated by reference.

BACKGROUND

The present invention relates to systems and methods for determining image representations at a pixel level.

Sparse coding refers to a general class of techniques that automatically select a sparse set of vectors from a large pool of possible bases to encode an input signal. While originally proposed as a possible computational model for the efficient coding of natural images in the visual cortex of mammals, sparse coding has been successfully applied to many machine learning and computer vision problems, including image super-resolution and image restoration. More recently, it has gained popularity among researchers working on image classification, due to its state-of-the-art performance on several image classification problems.

Many image classification methods apply classifiers based on a Bag-of-Words (BoW) image representation, where vector-quantization (VQ) is applied to encode the pixels or descriptors of local image patches, after which the codes are linearly pooled within local regions. In this approach, prior to encoding, a codebook is learned with an unsupervised learning method, which summarizes the distribution of signals by a set of "visual words." The method is very intuitive because the pooled VQ codes represent the image through the frequencies of these visual words.

Sparse coding can easily be plugged into the BoW framework as a replacement for vector quantization. One approach uses sparse coding to construct high-level features, showing that the resulting sparse representations perform much better than conventional representations, e.g., raw image patches. A two stage approach has been used where sparse coding model is applied over hand-crafted SIFT features, followed by a spatial pyramid max pooling. When applied to general image classification tasks, this approach has achieved state-of-the-art performance on several benchmarks when used with a simple linear classifier. However, this is achieved using sparse coding on top of hand-designed SIFT features.

A limitation of the above approaches is that they encode local patches independently, ignoring the spatial neighborhood structure of the image.

SUMMARY

In one aspect, a two-layer sparse coding model is used for modeling high-order dependency of patches in the same local region of an image. The first layer encodes individual patches, and the second layer then jointly encodes the set of patches that belong to the same group (i.e., image or image region). Accordingly, the model has two levels of codebooks, one for individual patches, and another for sets of patches. In a codebook learning phase, the model learns the two codebooks jointly, where each code in the higher-level codebook represents a dependency pattern among the low-level code words.

In another aspect, a method processes an image having a plurality of pixels by capturing an image using an image sensor; forming a first-layer to encode local patches on an image region; and forming a second layer to jointly encode patches from the image region.

In yet another aspect, systems and methods process an image having a plurality of pixels includes an image sensor to capture an image; a first-layer to encode local patches on an image region; and a second layer to jointly encode patches from the same image region.

Advantages of the preferred embodiment may include one or more of the following. The system uses fully automatic methods to learn features from the pixel level. The system is advantageous in terms of both modeling and computation. Because the individual patches of the same group are jointly encoded, the first-layer codebook yields a more invariant representation compared with standard sparse coding. Moreover, the use of a higher-level codebook, whose codewords directly model the statistical dependency of the first layer codewords, allows the method to encode more complex visual patterns. Computationally, the encoding optimization is jointly convex over both layers. Finally, the method generates sparse representations on the image pixel level, which shows the promise of learning features fully automatically. The unsupervised two-layer coding scheme generates image representations that are more invariant and discriminative than those obtained through one-layer coding, leading to improved accuracies for both image classification tasks.

DETAILED DESCRIPTION

Figure 1:
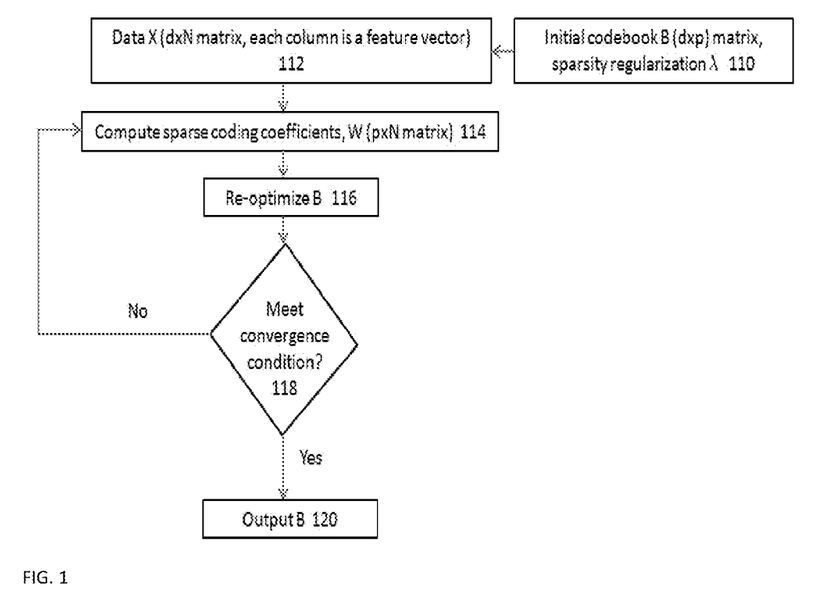
FIG. 1 shows an exemplary unsupervised codebook learning process with sparse coding.

FIG. 1 shows an exemplary unsupervised codebook learning process with sparse coding. The input to the process is an initial codebook matrix B and a sparsity regulation parameter $\lambda$ (110). B is a d×p matrix. Next, a data matrix X is formed with a size of d×N, where each of N columns is a feature vector (112). The process then determines sparse vector (112). The process then determines sparse coefficient matrix W, which is a p×N matrix (114). The process then determines if convergence is met (118). If not, the process loops back to 114 and if convergence is satisfied, the process output the codebook matrix B (120).

Figure 2:
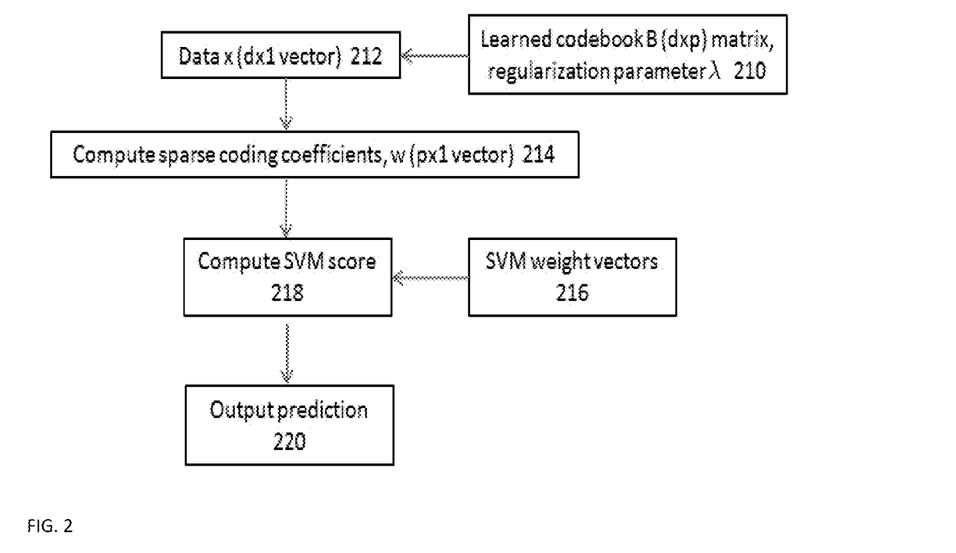
FIG. 2 shows an exemplary testing process with learned codebook of sparse coding.

FIG. 2 shows an exemplary testing process with learned codebook of sparse coding. The learned codebook B and the regularization parameter $\lambda$ is received as input (210). An x data vector is generated (212). The process perform sparse coding on x to yield sparse vector w (214). SVM weight vectors are received (216), and the SVM score of the sparse vector w is determined (218). The prediction is generated (220).

Figure 3:
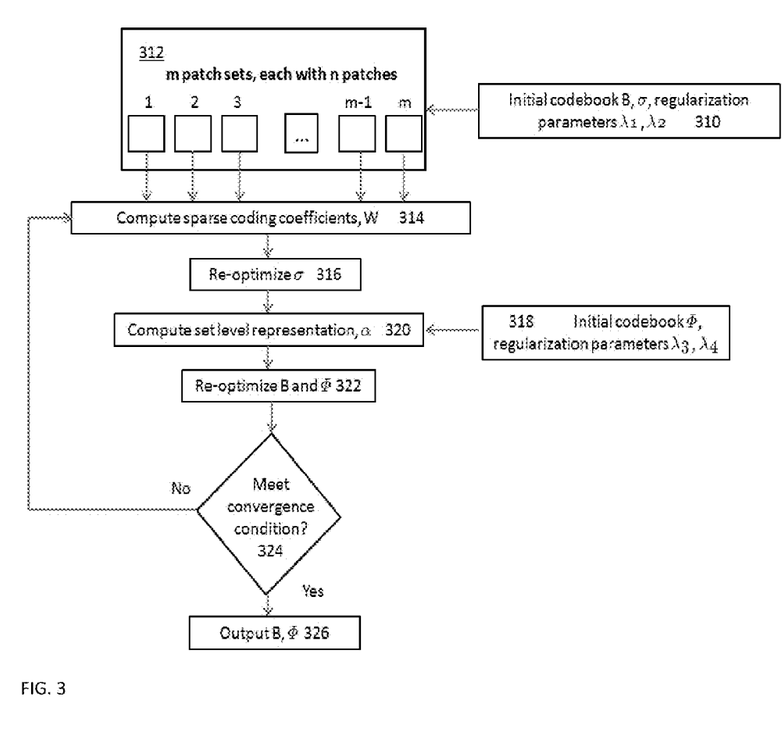
FIG. 3 shows an exemplary unsupervised codebook learning process with hierarchical sparse coding.

FIG. 3 shows an exemplary unsupervised codebook learning process with hierarchical sparse coding. The process receives an initial codebook B, $\sigma$, and regularization parameters $\lambda_1, \lambda_2$ (310). The process is applied to m patch sets, each with n patches (312). Sparse coding coefficients W are determined (314) for the n×m patches. The process then re-optimizes $\sigma$ (316) and based on an initial codebook $\Phi$ and regularization parameters $\lambda_3, \lambda_4$ (318), determines a set level representation $\alpha$ (320). The process re-optimizes B and $\Phi$ (322) given new W and $\alpha$. The convergence condition is checked (324). If there is no convergence, the process loops back to 314, and if convergence is met, the process outputs B and Φ (326).

Figure 4:
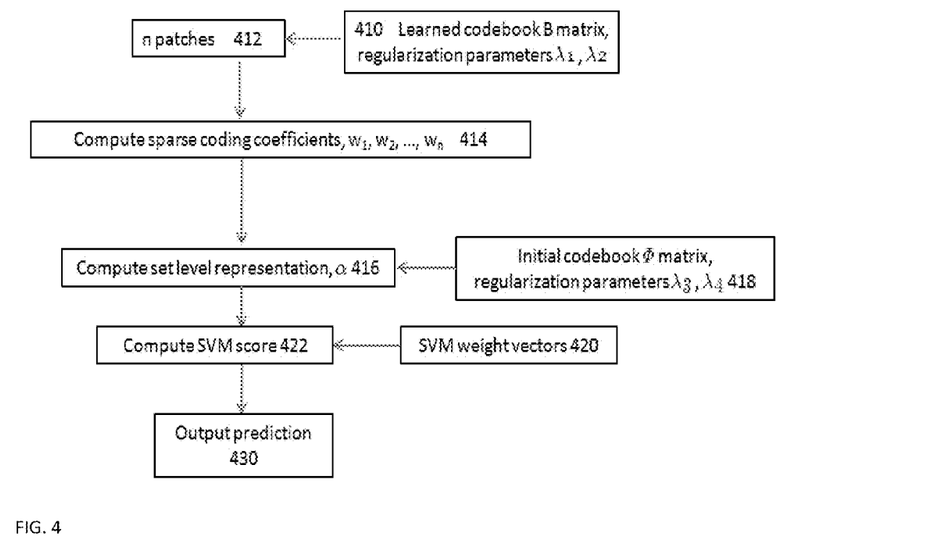
FIG. 4 shows an exemplary testing process with learned codebook of hierarchical sparse coding.

FIG. 4 shows an exemplary testing process with learned codebook of hierarchical sparse coding. The learned codebook B and the regularization parameters $\lambda_1$, $\lambda_2$ are received as input (410). The process generates n-patches (412) and determines a sparse coding coefficients $w_1 \ldots w_n$ (414). From an initial codebook matrix Φ and regularization parameters $\lambda_3$, $\lambda_4$ (418), the process determines a set level representation α (416). SVM weight vectors are received (420), and an SVM score is determined (422). The prediction is generated (430).

More details of Hierarchical Sparse Coding are discussed next. In one embodiment, $x_1, \ldots, x_n \in R^d$ represents a set of n patches within an image. For ease of discussion, the spatial information of the patches is used. However, it is straightforward to incorporate a dependence on location. The goal is to obtain a sparse representation for this set of patches. In one embodiment, $X=[x_1 x_2 \ldots x_n] \in R^{d \times n}$ represents a set of patches in matrix form. Let $B \in R^{d \times p}$ be a dictionary of codewords for the first level (the patch-level), as in standard sparse coding. In addition, a second level or set-level dictionary $\Phi = (\phi_1 \phi_2 \ldots \phi_q) \in R_+^{p \times q}$ can be used, where each element of Φ is non-negative. The set-level codebook Φ will be used to model the statistical dependencies among the representations of the patches $x_i$ in the patch-level.

Sparse representations cam be determined simultaneously at the patch-level and the set-level by carrying out the following optimization:

$$(W, \alpha) = \underset{W, \alpha}{\operatorname{argmin}} L(W, \alpha) + \frac{\lambda_1}{n} \|W\|_1 + \gamma \|\alpha\|_1 \quad (1)$$

subject to $\alpha \geq 0$,
where the loss function $L(W, \alpha)$ is given by $$\frac{1}{n} \sum_{i=1}^{n} \left\{ \frac{1}{2} \|x_i - Bw_i\|^2 + \lambda_2 w_i^T \Omega(\alpha) w_i \right\}.$$

Here $W=(w_1 w_2 \ldots w_n) \in R^{p \times n}$ is the patch-level representation, $\alpha \in R^q$ is the set-level representation, and $$\Omega(\alpha) \equiv \left( \sum_{k=1}^{q} \alpha_k \operatorname{diag}(\phi_k) \right)^{-1}.$$

The $l_1$ penalty on each $w_i$ and α encourages sparsity in the representations at both levels.

Taking $\lambda_2 = 0$ reduces the procedure to standard sparse coding, which encodes each patch independently. On the other hand, if $\lambda_2 > 0$, then the term involving α implements a type of weighted $l_2$ regularization of $w_i$. Note, however, that pooling these terms together results in an expression of the form $$\frac{1}{n} \sum_{i=1}^{n} w_i^T \left( \sum_{k=1}^{q} \alpha_k \operatorname{diag}(\phi_k) \right)^{-1} w_i = tr(S(W)\Omega(\alpha))$$

where $$S(W) \equiv \frac{1}{n} \sum_{i=1}^{n} w_i w_i^T \in R^{p \times p}$$

is the sample covariance of the patch-level representations. Thus, the loss function $L(W, \alpha)$ may be written more succinctly as $$L(W, \alpha) = \frac{1}{2n} \|X - BW\|_F^2 + \frac{\lambda_2}{n} tr(S(W)\Omega(\alpha)) \quad (2)$$

If the $w_i$ vectors were sampled independently from a Gaussian with covariance matrix $\Sigma(\alpha) = \Omega(\alpha)^{-1}$, the log-likelihood of W would be $tr(S(W)\Omega(\alpha))$, plus a constant that doesn't depend on W. Thus, the set-level code can be seen to model the covariance structure of the patch-level representations.

Hierarchical sparse coding, as defined above, is similar to but fundamentally different from the group sparse coding procedure. The method incorporates a group lasso penalty $|W|_2$ to encourage similar sparsity patterns for the patches in a group. However, there is no second codebook that is constructed at a higher level. Experimental results show the set-level codebook can be used that results in a hierarchical coding scheme that is interpretable, where the set-level codebook is effectively a shift-invariant representation of correlated patch-level bases.

Importantly, the encoding optimization problem above is jointly convex in both W and α. To see this, recall that the matrix-fractional function $f(x, Y) = x^T Y^{-1} x$ is jointly convex as a function of the vector x and the positive-semidefinite matrix Y, and $$\sum_{k=1}^{q} \alpha_k \operatorname{diag}(\phi_k)$$

is affine in α.

An alternating optimization procedure can be used to actually compute the solution, by iteratively optimizing W with α fixed, and then optimizing α with W fixed. The details of these optimizations are described next.

The optimization of the patch-level representation W for fixed α can be seen as a modified elastic net problem, using a weighted $l_2$ norm regularization. Specifically, the optimization $$\min_{W} \frac{1}{n} \sum_{i=1}^{n} \left\{ \frac{1}{2} \|x_i - Bw_i\|_2^2 + \lambda_1 \|w_i\|_1 + \lambda_2 w_i^T \Omega(\alpha) w_i \right\} \quad (3)$$

is a generalized elastic net problem. It can be transformed into a canonical LASSO problem as $$\min_{W} \frac{1}{n} \sum_{i=1}^{n} \left\{ \frac{1}{2} \|\tilde{x}_i - \tilde{B} w_i\|_2^2 + \lambda_1 \|w_i\|_1 \right\}$$

where $$\tilde{x}_i = \begin{bmatrix} x_i \\ 0_{p \times 1} \end{bmatrix},$$

$$\tilde{B} = \begin{bmatrix} B \\ \left(\lambda_2 \sum_{k=1}^{q} \alpha_k \phi_k\right)^{-\frac{1}{2}} \end{bmatrix}$$

and $0_{p \times 1}$ denotes a vector of p zeros. Fast methods based on iterative soft thresholding are available for efficiently solving this quadratic program.

The optimization problem for updating the set-level representation $\alpha$ with W fixed is $$\min_{\alpha \geq 0} \frac{1}{n} \sum_{i=1}^{n} \left\{ \lambda_2 w_i^T \left( \sum_{k=1}^{q} \alpha_k \mathrm{diag}(\phi_k) \right)^{-1} w_i \right\} + \gamma \|\alpha\|_1, \quad (4)$$

Again, the method transforms it into another formulation in order to take the advantage of well-developed lasso solvers, $$\min_{\alpha \geq 0, \Sigma \geq 0} \frac{\lambda_2}{n} \sum_{i=1}^{n} w_i^T \Sigma^{-1} w_i + \lambda_3 [(\sigma - \Phi \alpha)^2 + \lambda_4 \|\alpha\|_1], \quad (5)$$

where $\mathrm{diag}(\Sigma) = \sigma$ and $\lambda_4 = \gamma/\lambda_3$. This optimization is jointly convex with respect to both $\Sigma$ and $\alpha$. As $\lambda_3 \to \infty$, this formulation is equivalent to the original one. In the implementation $\lambda_3$ is a very large number.

An alternating minimization procedure is used, which alternates between the updates of $\sigma$ and $\alpha$. For fixed $\alpha$, the optimization for each element of $\sigma$ can be done independently, which implies that it is very fast to solve these one-dimensional optimization problems. On the other hand, the optimization for $\alpha$ is a standard nonnegative LASSO problem, which can also be efficiently solved.

Effective image coding requires high-quality codebooks B and $\Phi$. Next, methods to learn the codebooks to capture the structural information of data are discussed.

In one embodiment, $X = (X_1, \ldots, X_m)$ be m image patch sets, obtained from local regions of training images. The formulation of codebook learning aims at solving the following optimization problem.

$$\min_{B, \Phi} \left\{ \frac{1}{m} \sum_{j=1}^{m} \min_{W^j, \alpha^j} L(W^j, \alpha^j, \sigma^j, B, \Phi) \right\} \quad (6)$$

subject to $\|B_i\| \leq 1$, $\|\phi_k\|_1 \leq 1$, $i = 1, 2, \ldots, p, k = 1, 2, \ldots, q$ $\sigma^j \geq 0, \Phi \geq 0$ where $$L(W^j, \alpha^j, \sigma^j, B, \Phi) =$$

$$\sum_{i=1}^{n} \left[ \frac{1}{2n} \|x_i^j - B w_i^j\|^2 + \frac{\lambda_1}{n} \|w_i^j\|_1 + \frac{\lambda_2}{n} (w_i^j)^T \Sigma_j^{-1} w_i^j \right] +$$

$$\lambda_3 [\|\sigma_j - \Phi \alpha_j\|_2^2 + \lambda_4 \|\alpha\|_1]$$

where $\Sigma_j$ is a diagonal matrix and $\mathrm{diag}(\Sigma_j) = \sigma_j$. The objective function is the same as the one in the coding phase if the codebooks are given. One important feature of the above formulation is that the set-level dictionary $\Phi$ is required to be nonnegative.

The optimization problem can be solved by iteratively alternating the following two steps: 1) given the codebooks B and $\Phi$, compute the optimal coding using the methods described above; 2) given the new coding, re-optimize the codebooks. One implementation of Step 2) allows B and $\Phi$ to be optimized independently.

For solving B, the optimization problems can be solved via their dual formulation, which become a convex optimization with solely nonnegative constraints. A projected Newton method can efficiently solve the resulting optimization. The projected Newton method has superlinear convergence rate under fairly mild conditions.

Optimizing $\Phi$ is more interesting due to the extra nonnegative constraint on its elements. Fortunately, the optimization is still convex. A projected gradient method is used for solving the optimization problem. For the projected gradient, each iteration step consists of two sub-steps. First, each column of $\phi_k$ goes one step along the gradient direction $$(\phi_k)_{1/2} = \phi_k - \eta \nabla_{\phi_k} \quad (7)$$

where $\nabla_{\phi_k}$ is the gradient of $\phi_k$, and $\eta$ is a stepsize that needs to be determined by line search. Then the projection step determines the point in the constrained domain that is closest to $(\phi_k)_{1/2}$. The projection can be done by independently solving the following optimization problem on each column of $\Phi$:

$$\min_{\phi_k} \|\phi_k - (\phi_k)_{1/2}\|^2 \quad (8)$$

$$\text{subject\_to} \sum_{l=1}^{p} \phi_{kl} = 1, \phi_{kl} \geq 0 \quad (9)$$

where $\phi_{kl}$ is the $l^{th}$ element of $\phi_k$. This optimization is to project $(\phi_k)_{1/2}$ onto a probabilistic simplex, and it can be solved very efficiently.

The hierarchical sparse coding is readily applicable to learning image representations for classification. As revealed by the data encoding procedure discussed above, the whole model operates on a set X of image patches in a local region, first nonlinearly mapping each x from the region to its sparse code w, and then (implicitly) pooling the codes of the set to obtain $\Sigma$, which is akin to the sample (diagonal) covariance of the sparse codes in that region, and corresponds to a way of "energy pooling". In the next level, the model encodes $\Sigma$ nonlinearly to obtain the sparse code $\alpha$ for the set X. The encoding procedure is implemented by solving a joint convex optimization problem.

Next, the modeling of spatial dependence is discussed. A slight modification can lead to a more general formulation, in the sense that $\Sigma$ acts as not the sample covariance for only one region, but for several neighboring regions jointly. Then the learned bases $\Phi$ will capture the spatial dependence among several regions. Without loss of generality, consider a joint model for 2×2 local regions: if each region contains n patches, let X and W denote all the 4×n patches and their first-layer codes in these 4 regions. Then L(W,α) in (2) is modified as $$\frac{1}{n}\|X - BW\|_F^2 + \frac{\lambda_2}{n}\sum_{s,t} tr(S(W^{(s,t)})\Omega^{(s,t)}(\alpha))$$

where $$\Omega^{(s,t)}(\alpha) \equiv \left(\sum_{k=1}^{q} \alpha_k (\phi_k^{(s,t)})\right)^{-1} \quad (10)$$

is the inverse diagonal covariance for the (s,t)-th region, s=1, 2, t=1,2. In this model, each local descriptor has its own first-level coding, while the 2×2 regions share the joint second-layer coding α. Each basis $\phi_k = [\phi_k^{(1,1)}, \phi_k^{(1,2)}, \phi_k^{(2,1)}, \phi_k^{(2,2)}] \in R^{p \times 4}$ describes a spatial co-occurrence pattern across 2×2 regions.

Hierarchical convolution coding is discussed next. This improvement applies the above joint model to convolute over an image. Again, without loss of generality, let the image be partitioned into 4×4 regions, indexed by (s,t), then convolution of the two-layer hierarchical coding over every 2×2 region neighborhood leads to 3×3 coding results $\alpha^{(u,v)} \in R^q$, where u=1,2,3 and v=1,2,3. Here each (u,v) indexes a "receptive field" of the hierarchical coding. X and W denote all the patches and their first-layer codes in the image. Then L(W,α) in (2) is modified as $$\frac{1}{n}\|X - BW\|_F^2 + \frac{\lambda_2}{n}\sum_{s,t}\sum_{u,v} \varphi(W^{(s,t)}, \alpha^{(u,v)}) \quad (11)$$

where $\phi(W^{(s,t)}, \alpha^{(u,v)})$ is defined to be zero if the (s,t)-region is not in the (u,v) receptive field, otherwise $$\phi(W^{(s,t)}, \alpha^{(u,v)}) = tr(S(W^{(s,t)})\Omega^{(s,t)}(\alpha^{(u,v)}))$$

where $$\Omega^{(s,t)}(\alpha^{(u,v)}) \equiv \left(\sum_{k=1}^{q} \alpha_k^{(u,v)} (\phi_k^{r(s,t,u,v)})\right)^{-1}. \quad (12)$$

Here, r(s,t,u,v) indexes the relative position of the (s,t) region in the (u,v) receptive field. The coding method and codebook learning method are basically the same as those described in the previous section.

Next, Image Representation is discussed. The system samples image patches densely at a grid of locations. One embodiment partitions the patches into different non-overlapping regions based on their spatial locations, and then treats each window of several regions as a receptive field. For example, a typical setting can be Each patch is 4×4 pixels, sampled from a grid with step size 2 pixels;
Each non-overlapping region contains 4×4 patches;
Each receptive field contains 4×4 such non-overlapping regions, with a step size 1.

Each receptive field will give rise to a q-dimensional second-layer code vector. The system pools the second-layer code vectors by using max pooling. In order to obtain better shift and scale invariance, the system partitions each image in different scales, for example, into 1×1 and 2×2 blocks, and pool the second-layer codes within each block. The system concatenates the block-wise results to form the image representation.

Although a two-layer model is described, multi-layer models can be used for "deep learning". Such systems can learn a stack of sparse coding models.

The architecture of two-layer convolution coding has an interesting analogy to sparse coding on a SIFT feature vector. For each SIFT descriptor, its receptive field contains 4×4 smaller non-overlapping regions—within each region, responses of a 8-dimensional coding, corresponding to a histogram of 8 orientations, are pooled together. A SIFT descriptor is then resulted from concatenating the 4×4 pooling results, outputting a 128 dimensional vector. Then sparse coding is the second-layer coding applied on top of SIFT. Sparse coding on SIFT leads to state-of-the-art results on a number of image classification benchmarks. The method presented here follows a similar processing architecture, but is a fully automatic approach learning features from raw pixels.

The hierarchical sparse coding produces image representations that improve accuracy on the MNIST digit recognition problem and the Caltech101 object recognition benchmark. The system gives excellent results for hand-written digit recognition on MNIST and object recognition on the Caltech101 benchmark, in which the later is the first time such result achieved by automatically feature learning from the pixel level, rather than using hand-designed descriptors. The results show that automatic learning features from image pixels is accurate and computationally efficient.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 5:
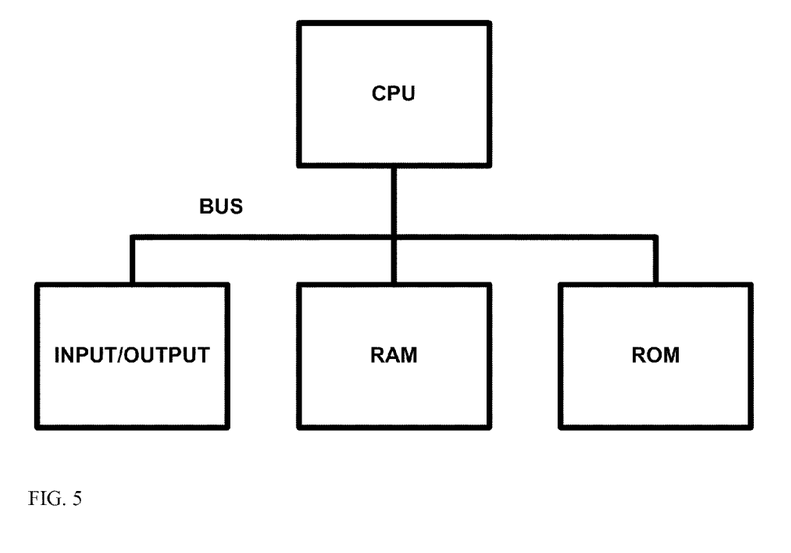
FIG. 5 shows an exemplary computer to implement codebook learning and testing.

By way of example, a block diagram of a computer to support the system is discussed next in FIG. 5. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to process an image having a plurality of pixels, comprising:
    capturing an image using an image sensor;
    forming a first-layer to encode local patches on an image region;
    forming a second layer to jointly encode patches from the image region; and
    determining $$\frac{1}{n}\|X - BW\|_F^2 + \frac{\lambda_2}{n}\sum_{s,t} tr(S(W^{(s,t)})\Omega^{(s,t)}(\alpha))$$

where $$\Omega^{(s,t)}(\alpha) \equiv \left(\sum_{k=1}^{q} \alpha_k(\phi_k^{(s,t)})\right)^{-1}$$

is an inverse diagonal covariance for an (s,t)-th region, s=1,2, t=1,2, X is a set of image patches in a local region and X and W denote all 4×n patches and their first-layer codes in these 4 regions for a fixed α, φ is a basis describing a a spatial co-occurrence pattern, B is a codebook, log-likelihood of W is tr (S(W)Ω(α)), $\lambda_2$ is a sparsely regulation parameter.

2. The method of claim 1, comprising learning higher-order dependencies among related image patterns.

3. The method of claim 2, comprising generating sparse, invariant, and discriminative image representations from the pixels.

4. The method of claim 1, comprising learning the two-layer codebooks from unlabeled data.

5. The method of claim 1, wherein the first layer encodes local patches of an image, whose energy pooled in a local region is passed to the second layer to jointly encode signals from the region.

6. The method of claim 1, comprising learning high-order dependency among patterns in a local neighborhood of images.

7. The method of claim 1, comprising modeling of spatial dependence.

8. The method of claim 1, comprising performing hierarchical convolution coding.

9. The method of claim 1, wherein the second layer forms a joint representation that models a covariance of the patches from neighboring image regions.

10. The method of claim 1, comprising performing unsupervised codebook learning process with sparse coding.

11. The method of claim 10, comprising receiving an initial codebook matrix and a sparsely regulation parameter; iteratively determining a sparse coding coefficient matrix; and updating the codebook matrix.

12. The method of claim 10, comprising testing the learned codebook of sparse coding.

13. The method of claim 11, comprising generating SVM weight vectors; determining an SVM score; and generating a prediction.

14. The method of claim 13, comprising:
    receiving a first codebook B, σ, and first regularization parameters to apply to m patch sets, each with n patches;
    determining sparse coding coefficients; re-optimizing σ;
    based on a second codebook Φ and second regularization parameters, determining a set level representation α;
    re-optimizing B and Φ (322); and
    checking for convergence and if convergence is met, finalizing B and Φ.

15. The method of claim 13, comprising testing the learned codebook with hierarchical sparse coding.

16. The method of claim 13, comprising:
    determining sparse coding coefficients;
    determining a set level representation;
    determining an SVM score is determined from SVM weights; and
    generating a prediction.

17. The method of claim 1, comprising performing unsupervised codebook learning with hierarchical sparse coding.

18. A system to process an image having a plurality of pixels, comprising:
    an image sensor to capture an image;
    a first-layer to encode local patches on an image region; and
    a second layer to jointly encode patches from the same image region; and
    determining with a processor $$\frac{1}{n}\|X - BW\|_F^2 + \frac{\lambda_2}{n}\sum_{s,t} tr(S(W^{(s,t)})\Omega^{(s,t)}(a))$$

where $$\Omega^{(s,t)}(\alpha) \equiv \left(\sum_{k=1}^{q} \alpha_k(\phi_k^{(s,t)})\right)^{-1}$$

is an inverse diagonal covariance for an (s,t)-th region, s=1,2, t=1,2, X is a set of image patches in a local region and X and W denote all 4×n patches and their first-layer codes in these 4 regions for a fixed α, φ is a basis describing a a spatial co-occurrence pattern, B is a codebook, log-likelihood of W is $_{tr}$(S(W)Ω(α)), $\lambda_2$ is sparsity regulation parameter.

19. The system of claim 18, comprising means for learning the two-layer codebooks from unlabeled data.

* * * * *